Nov. 10, 1970  F. W. HARDAWAY  3,539,825

HIGHLY LINEAR VOLTAGE TO FREQUENCY CONVERTER

Filed Jan. 24, 1967

INVENTOR.
FRED W. HARDAWAY

BY
Moody and Kintzinger
ATTORNEYS

United States Patent Office 3,539,825
Patented Nov. 10, 1970

1

3,539,825
HIGHLY LINEAR VOLTAGE TO FREQUENCY CONVERTER
Fred W. Hardaway, Arlington, Tex., assignor to Collins Radio Company, Cedar Rapids, Iowa, a corporation of Iowa
Filed Jan. 24, 1967, Ser. No. 611,445
Int. Cl. H03k *4/08*
U.S. Cl. 307—228                     2 Claims

ABSTRACT OF THE DISCLOSURE

A DC to AC converter circuit providing a highly linear conversion and using a DC operational amplifier with a feedback capacitor that together act as an integrator developing a sloping curve of one direction in the voltage out of the amplifier during a first time portion of each cycle of operation, and then, during a second time portion of each cycle, a "reset" portion, a reverse direction sloping curve. This entails charging of the feedback capacitor as primarily determined by a DC controlling voltage input acting through the DC operational amplifier through the first time portion of each cycle and then reverse direction charging of the feedback capacitor as determined by the summed DC controlling voltage input and a reset voltage through a reset circuit and with the reset voltage being the predominate voltage through a predetermined consistent time period for each cycle. Voltage level threshold activated circuitry connected to the output of the DC operational amplifier develops a voltage that activates the reset circuit through a predetermined time length portion of each operational cycle of the converter circuit.

---

Figure 1:
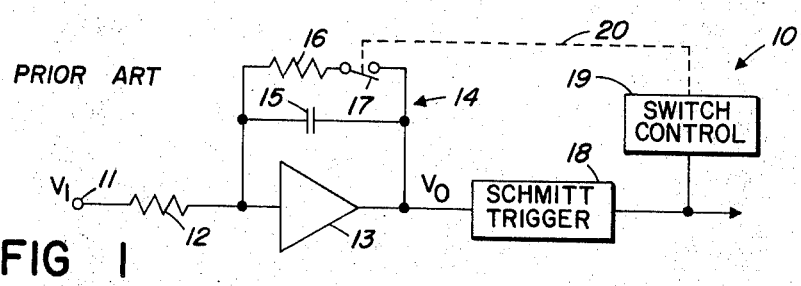

This invention relates in general to voltage controlled oscillators, and in particular, to a voltage to frequency converter providing a highly linear frequency output to DC controlling voltage input.

Some existing conventional voltage controlled oscillator circuits use a DC operational amplifier with feedback capacitive means and a resistive path in parallel therewith to develop a voltage used as an input to a trigger circuit, such as a Schmitt trigger circuit. This is useful for developing a trigger circuit output not only for utilizing equipment as desired, but also as a switch control signal switching the resistive path, in parallel with the feedback capacitive means about the DC operational amplifier, into and out of the circuit. With such a voltage controlled oscillator circuit the voltage developed out of the operational amplifier is generally the integral of the DC controlling voltage input as long as the output voltage is less than and approaching the upper trip point voltage of the Schmitt trigger circuit. When this upper voltage trip point is reached the Schmitt trigger switches to such a state that the output thereof causes the switch control to close the low resistive feedback path about the operational amplifier. This results in a current discharge path being established about the feedback capacitive means causing the voltage out of the amplifier to drop toward and ultimately to a lower trip point voltage with respect to the Schmitt trigger circuit. When this lower trip point voltage level is reached the action of the trigger circuit is such that its output causes the switch control to then open the resistive feedback path and the cycle is repeated. Obviously, the total time period of the cycle is the sum of the two time periods, one for the output voltage to increase to the upper trip point voltage, and the second being the time for the output voltage to decrease from the upper trip point voltage level to the lower trip point

2 voltage level. While the first time portion is inversely proportional to the control voltage input, the second time portion is practically constant. Hence, it follows that since the frequency of the voltage controlled oscillator, in other words, the Schmitt trigger in this instance, is a reciprocal of the time of the first portion and the time of the second portion, the constant time period second portion causes a non-linearity, or error, in the conversion of control voltage to frequency. This error is particularly significant when a wide frequency conversion range is required, and with the reset time of the second period causing a relatively large error in the conversion accuracy particularly at the high frequency end of the operational frequency range.

It is, therefore, a principal object of this invention to provide a voltage to frequency converter eliminating such error particularly at the high frequency end of the operational frequency conversion range.

Further objects of such a voltage to frequency converter include, improvement of switching control circuitry for such a conversion unit using a switch element connected to floating or changing voltage levels, circuit simplification, increased reliability, and high linearity of conversion throughout the entire operational range of DC voltage conversion to frequencies.

Features of this invention useful in accomplishing the above objects include, in a highly linear DC voltage to frequency converter, the use of a DC operational amplifier, a one-shot multivibrator circuit, and the use of a voltage threshold activated circuit located between the DC operational amplifier and the one-shot multivibrator circuit. The improved highly linear DC voltage to frequency converters utilize a DC operational amplifier with a feedback capacitor connected between the output and the input of the amplifier. A voltage summing impedance network is also employed at the input to the DC operational amplifier with a resistor in the input signal conductive path from a controlled variable voltage DC signal source with the input DC voltage level as set thereon being constantly applied through the connective resistor between the signal source and the amplifier. Further impedance means of the summing network is that of a reset circuit also including a bias to conduction controlled device that may be biased for completing a conductive path through the reset circuit from a voltage supply for a portion of each operational cycle. The first portion of each operational cycle involves the application of the DC controlling voltage from the DC controlling voltage source alone, and with the second portion involving the summed resultant of the controlling voltage input and the result of voltage applied to and current flow through the reset circuit and with the reset voltage for this second period of operation being the predominate voltage. It is a system wherein the controlling voltage input is of one polarity through the adjustable operational range of the system effective through a first time portion of each cycle to generate with an integrating action through the DC amplifier and feedback capacitor a predetermined polarity going slope. With a negative DC controlling voltage input to the DC operational amplifier an ascending $V_0$ voltage slope is provided out of the DC operational amplifier. Then when the reset circuit is biased for conduction the summed effective voltage input to the operational amplifier results in an opposite descending sloped integrated portion of the curve. The reset circuit may have the bias to conduction device thereof connected for activation from a portion of the circuit out of the DC operational amplifier developing sufficient voltage to actuate the bias to conduction device. While in some embodiments the bias to conduction device in the reset circuit may be a transistor, or other such device, in some embodiments it is a diode connected to the positive going portion, or collector of a transistor, in a multivibrator of the DC voltage to frequency converter. The diode is biased to conduction when the particular transistor it is connected to in the multivibrator is biased to non-conduction and the transistor collector is permitted to immediately go to a higher voltage level.

A specific embodiment representing what is presently regarded as the best mode of carrying out the invention is illustrated in the accompanying drawing.

Figure 2:
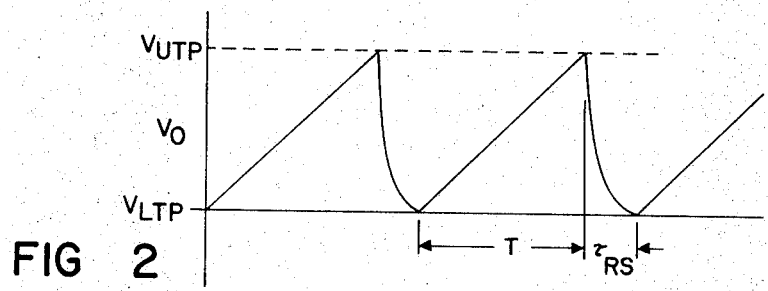
Figure 3:
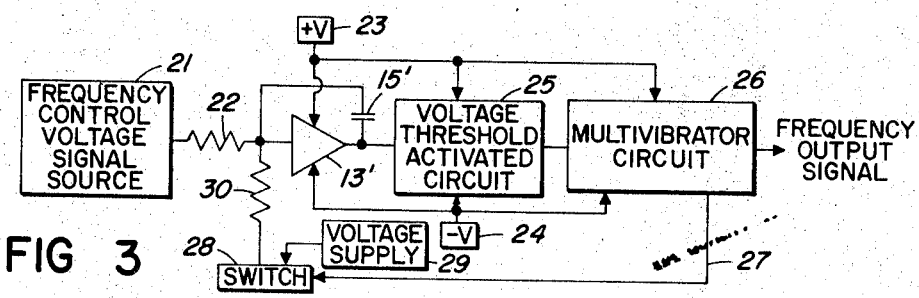
Figure 4A:
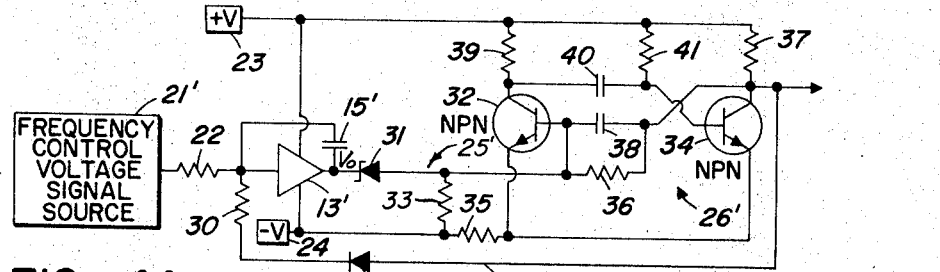
Figure 4B:
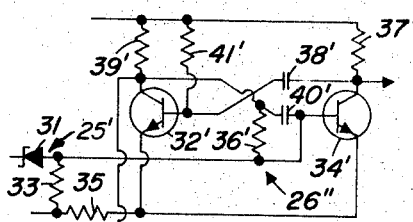
Figure 5:
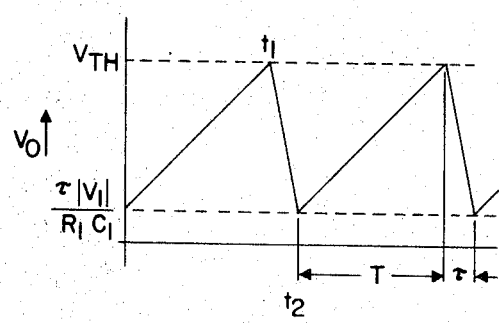

In the drawing:

FIG. 1 represents a prior art voltage controlled oscillator circuit using an integrator voltage section, a Schmitt trigger circuit and a reset circuit;

FIG. 2, the graph waveform of voltage versus time of the voltage $V_0$ out of the integrator applied as an input voltage to the Schmitt trigger of the prior art voltage to frequency converter of FIG. 1;

FIG. 3, a block schematic diagram of applicant's highly linear voltage to frequency converter using a DC operational amplifier, a voltage threshold activated circuit, a one-shot multivibrator circuit and reset circuitry;

FIG. 4A, a more detailed schematic showing of the highly linear voltage to frequency converter of FIG. 3;

FIG. 4B, a partial schematic showing circuit modification from the embodiment of FIG. 4A; and FIG. 5, a voltage waveform graph of the voltage $V_0$ versus time out of the DC operational amplifier applied as an input to the voltage threshold activated circuit.

Referring to the drawing:

The prior art DC voltage to frequency converter 10 of FIG. 1 has a variable DC voltage source terminal 11 connected through resistor 12 as an input to DC operational amplifier 13. A feedback circuit 14 with a capacitor 15 is connected between the output and the input of the DC operational amplifier 13 and includes a resistive circuit path with resistor 16 and a normally open switch 17 in parallel with the capacitor 15. The signal voltage $V_0$ developed as an output from the operational amplifier 13 is applied as an input to Schmitt trigger circuit 18, the signal output of which is applied to utilizing equipment as desired and also as an input to a switch control circuit 19 having an output 20 connection for the operation of switch 17 as determined by the actuation of switch control circuit 19. While switch control circuit 19 is shown to have a mechanical output for operating a mechanical switch 17 it, quite obviously, could be an electrical output operating a solid state device such as a transistor for completing a circuit path through the resistive circuit including resistor 16 in parallel with capacitor 15.

Referring now to the waveform graph of FIG. 2 for supporting what has hereinbefore been described with respect to such a prior art circuit, the first portion of each cycle of the voltage $V_0$ waveform is substantially a straight slope integral of the DC controlling voltage input just so long as this output voltave $V_0$ is less than and approaching the upper trip point voltage $V_{utp}$. Then when the upper trip point voltage is reached, the Schmitt trigger is immediately switched to such a state that its output causes the switch control circuit 19 to close the resistive feedback path and immediately start discharge of the capacitor 15. This results in a current discharge path being established about the feedback capacitor 15 and cause the voltage $V_0$ to drop in the second time portion of each cycle exponentially towards the lower trip point voltage with the trip points being with respect to and as determined by the Schmitt trigger circuit. Obviously, while the slope of the first portion, the integral of the input signal portion, of each cycle of the $V_0$ waveform may be altered by variation of the DC input signal voltage applied to the voltage to frequency converter and change, the second time portion of each cycle of the waveform, that is, the portion returning from the upper trip point voltage to the lower trip point voltage will always remain substantially the same thereby giving rise to the non-linearity error commented on hereinbefore.

Referring now to FIG. 3, a block schematic diagram of a highly linear voltage to frequency converter is shown utilizing a DC voltage input from a frequency controlled voltage signal source 21 through a resistor 22 as an input to DC operational amplifier 13'. The DC operational amplifier 13' is supplied with a positive voltage input from a positive voltage supply 23, a negative voltage input from a negative voltage supply 24, and is provided with a feedback capacitor 15' connected between the output and the input of the amplifier. The output of the operational amplifier is connected as an input to a voltage threshold activated circuit 25 also connected to both the positive voltage supply 23 and the negative voltage supply 24. The output of the voltage threshold activated circuit 25 is passed as an input to a one-shot multivibrator circuit 26, including a reset circuit connection, also connected to the voltage supplies 23 and 24. The one-shot multivibrator circuit is provided with a frequency output signal terminal for connection to utilizing equipment as desired, and also with a reset line 27 which extends to a switch 28 having an additional input from a voltage supply 29 and connected through reset resistor 30 to the common junction of resistor 22, amplifier 13' and capacitor 15'.

When the switch 28 is closed by signal control through line 27 current flow through reset resistor 30 results in a summed voltage including the input voltage from signal source 21 at the input to the DC operational amplifier 13'. Quite obviously the DC voltage level applied as an input to the DC operational amplifier 13' is the result of the summed voltages at the input thereto as additionally affected by the integrating output action of the DC operational amplifier 13' reflected back through the feedback capacitor 15' and as determined by the charged state and changing state of the capacitor 15' at any one instant of time. Switch 28 could be a transistor having an element connected to the resistor 30, another element connected to the voltage supply 29 and a control element connected for activation and closing of a circuit path between the voltage supply 29 and resistor 30 when activated by a signal through line 27. A transistor as switch 28 may be either an NPN or a PNP transistor and the voltage supply 29 may be either a plus or a minus voltage supply, as appropriate, with the particular transistor used and the particular voltage polarities being those required for the particular application consistent with the line 27 signal voltage polarity involved. Thus, obviously, voltage supply 29 could be replaced by either the positive voltage supply 23 or the negative voltage supply 24 as may be appropriate.

With the specific embodiment of FIG. 4A, a frequency control voltage signal source 21' developing a variable control negative DC voltage signal is connected through resistor 22 to the input of operational amplifier 13'. With this embodiment some components the same or substantially the same will carry the same, or primed numbers, relative to the general showing of FIG. 3, or with reference to the prior art voltage to frequency converter or voltage controlled oscillator 10. In the FIG. 4A embodiment the operational amplifier 13' is provided with a feedback capacitor 15', just as in the general embodiment of FIG. 3, and includes the same connections to positive and negative voltage supplies 23 and 24, respectively. The output of the operational amplifier 13' is connected to the cathode of Zener diode 31 of the voltage threshold activated circuit 25'. The anode of Zener diode 31 is connected to the base of NPN transistor 32, of one-short multivibrator circuit 26', and also through resistor 33 to the negative voltage supply 24.

With respect to the one-shot multivibrator circuit 26' the emitter of the transistor 32 is connected in common with the emitter of another NPN transistor 34 and through resistor 35 to the negative voltage supply 24. The base of transistor 32, and its bias connection through resistor 33 that also voltage bias references the anode of Zener diode 31, is connected serially through resistors 36 and 37 to the positive voltage supply 23. Capacitor 38 is also connected in parallel with resistor 36 between the base of transistor 32 and the junction of the collector of transistor 34 and the resistor 37. The collector of NPN transistor 32 is connected through resistor 39 to the positive voltage supply 23 and also through capacitor 40 to the base of NPN transistor 34, and the base of the transistor 34 is also connected through a resistor 41 to the positive voltage supply 23. The frequency output signal terminal or line from the collector of transistor 34 has a branch reset line 27' that is connected to the anode of diode 42, the cathode of which is connected to and through resistor 30 to the common junction of the input of DC operational amplifier 13', the capacitor 15' and the input signal resistor 22.

During operation of the highly linear voltage to frequency converter of FIG. 4A, through the first time portion, the ascending voltage $V_0$ portion, of each cycle out of the DC operation amplifier 13' the controlling negative voltage input fed through resistor 22 causes the voltage $V_0$, with the DC operational amplifier acting as an integrator with feedback capacitor 15', to ascend at a predetermined slope and rate as determined by the absolute value of the negative voltage input applied through resistor 22. When the voltage output $V_0$ of the DC operational amplifier 13' attains a predetermined level as applied to the Zener diode 31, at the threshold bias to conduction of Zener diode 31, the anode output of the Zener diode establishes a voltage biasing transistor 32 positively to conduction. This results in a simultaneous reverse bias being applied to the base of NPN transistor 34 insuring the cutoff of conduction of the transistor 34 and thereby immediately re-establishing a positive voltage at the collector output of transistor 34 and of the one-shot multivibrator circuit 26' and also establishing a positive pulse voltage on the reset line 27'. During the time periods of positive voltage pulse outputs the diode 42 in the reset circuit is biased to conduction with the diode 42 being used, in this instance, in place of a transistor switch, or the like, as may be employed at the switch location 28 of the general embodiment of FIG. 3, and with this being connected through the resistor 30 to the input of the DC operational amplifier 13'.

It should be noted during the downward sloped portions, the second time period portions of the $V_0$ voltage developed out of the DC operational amplifier 13', that the DC positive voltage applied through resistor 30 to the input of the DC operational amplifier 13' is the predominant voltage. This is as compared with the input voltage applied through resistor 22 and summed at the input to the amplifier, and as further altered by the feedback effect of the $V_0$ amplifier voltage output developed, in the feedback action through the capacitor 15', on the voltage at the input to the amplifier. It should be noted further that the feedback voltage could in the embodiment of FIG. 4A be taken anywhere in the circuit from the output of the amplifier 13' on rather than from the output of the one-shot multivibrator circuit 26' as indicated as long as the positive voltage level developed at that particular location in the circuit is sufficient to bias the diode 42 to conduction and be the predominant voltage as compared to the input voltage applied through resistor 22 at the input to the DC operational amplifier 13'. This same rationale also applies with respect to the general embodiment of FIG. 3 where just so long as the voltage developed at the appropriate location in the circuit is sufficient to bias the switch 28 to the conductive state to establish a conductive path from the voltage supply 29 through the resistor 30 to the input of the DC operational amplifier 13'.

Referring now also to the further modification of FIG. 4B, which is substantially the same as the embodiment of FIG. 4A except for the changes in the portions shown wherein the positive voltage feedback is taken from the collector of the NPN transistor 32' as opposed from being taken from the collector of the NPN transistor 34' and the connection with the threshold voltage threshold activated circuit 25' is to the base of the NPN transistor 34'. Other circuit changes are those that appear in FIG. 4B to be consistent with the other changes from FIG. 4A. This approach is employed where they may be problems of signal output loading by the utilizing circuitry that may have an effect upon the operation of the voltage to frequency converting circuit.

Referring particularly to the graphed $V_0$ curve of FIG. 5 representing the voltage developed out of the DC operational amplifier 13', for the various embodiments, it should be noted that the upper threshold level voltage $V_{th}$ represents the predetermined activating voltage of the voltage threshold activated circuit wherein an immediate transition is undertaken from the first portion of each $V_0$ signal cycle of operation to the second time period portion. Further, the second time period portion, a downward sloping portion, of each of these cycles of the $V_0$ curve are of a constant time duration as determined by the positive pulse period time of the one-shot multivibrator circuit as applied to the reset line 27, 27' or 27" as the case may be. Now with reference to variation of the controlling variable controlling voltage input signal the ascending slope of the first period portion of each cycle becomes steeper and steeper with an increasing greater absolute value of the DC controlling voltage input and the time period of the first time period portion of each cycle becomes less and less. At the same time the descending slope of the second period time portion of each cycle, having a constant time period as determined by the multivibrator circuit, becomes less steep. Therefore, the voltage of the lower transition points of the curve varies and becomes higher with the increase of absolute magnitude of the controlling DC voltage input. This results in a highly linear conversion to correspondingly higher frequencies being developed as an output of the highly linear voltage to frequency converter circuits. It should be noted further that variations may be made in these circuits wherein the controlling voltage input would, for example, be, instead of a negative voltage input, a positive voltage input. Further, perhaps the NPN transistors would be instead PNP transistors and/or the reset voltage would be a negative voltage rather than a positive voltage and still in effect provide substantially the same operational results as with the particular general embodiment and specific embodiments shown and described.

To illustrate operation of the applicant's highly linear voltage to frequency converters the following mathematical development and treatment with certain general assumptions is explanatory as related to FIG. 4A.

If $$R_{RS}C_f \frac{V_{th}}{V_{RS}} = \tau$$

the pulse width of the multivibrator, then the frequency of the oscillator is directly proportional to the input voltage ($V_1$). The following equation describes the oscillator output.

$$V_o(t) = \frac{1}{R_1 C_f} \int_0^{t_1} |V_1| dt + V_o(0) \text{ for } V_o < V_{th}$$

$$= \int_{t_1}^{t_2} \left( \frac{|V_1|}{R_1 C_f} - \frac{V_{RS}}{R_{RS} C_f} \right) dt + V_{th} \text{ for } V_o = V_{th} \quad (1)$$

and for $\tau$ seconds afterwards. From Equation 1, the length of time (T) for $V_0(t)$ to reach $V_{th}$ can be determined.

$$V_{th} = \frac{|V_1|}{R_1 C_f} T + V_o(O)$$

or $$T = \frac{V_{th} - V_o(O)}{|V_1|} R_1 C_f \qquad (2)$$

but $$V_o(O) = V_o(t_2) = \left(\frac{|V_1|}{R_1 C_f} - \frac{V_{RS}}{R_{RS} C_f}\right)(t_2 - t_1) + V_{th}$$

and since $(t_2 - t_1) = \tau$ and $$R_{RS} = \frac{V_{RS} \tau}{C_f V_{th}}$$

$$V_o(O) = \left(\frac{|V_1|}{R_1 C_f} - \frac{V_{RS} C_f V_{th}}{V_{RS} \tau C_f}\right) \tau + V_{th}$$

$$V_o(O) = \frac{\tau |V_1|}{R_1 C_f} \qquad (3)$$

From Equations 2 and 3

$$T = \frac{V_{th}}{|V_1|} R_1 C_f - \tau \qquad (4)$$

The frequency of oscillation is given by Equation 5

$$\text{freq.} = \frac{1}{T + \tau} = \frac{|V_1|}{R_1 C_f V_{th}} \qquad (5)$$

Therefore, the frequency is directly proportional to the input voltage ($V_1$). FIG. 5 shows the waveform of the oscillator. The maximum frequency is equal to $1/2\tau$.

At this point it should be realized with respect to the embodiment of FIG. 4A, the reset circuit resistance includes in addition to the resistor 30, resistor 37, and in the embodiment of FIG. 4B, in addition to the resistor 30, the resistor 39'.

Components and values used, in a highly linear DC voltage to frequency converter with a DC controlling voltage variable from minus 50 millivolts to minus 7 volts providing a highly linear frequency conversion range of from 0.0833 c.p.s. to 11.8 c.p.s., according to the invention include the following:

DC operational amplifier 13': PP65
Capacitors 15' and 40: 1 microfarad
Resistors 22, 33, 36 and 41: 100K ohms
Voltage supply 23: +15 volts
Voltage supply 24: —15 volts
Resistor 30: 68.6K ohms
Zener diode 31: 1N758
NPN transistors 32 and 34: 2N1613
Resistors 37 and 39: 10K ohms
Capacitor 38: 0.022 microfarad
Capacitor 40: 1 microfarad
Diode 42: 1N645

Whereas this invention is here illustrated and described with respect to several embodiments thereof, it should be realized that various changes may be made without departing from the essential contribution to the art made by the teachings hereof.

I claim:

1. In a DC to AC converter for providing a highly linear conversion from a controllable level DC voltage input to AC frequency output: a DC operational amplifier; DC control voltage input means connected to the DC operational amplifier; at least one voltage supply connection for the converter circuit; capacitive feedback means connected between the output and input of said operational amplifier; voltage pulse developing circuit means; time period determining multivibrator circuit means for providing predetermined consistent cyclical voltage pulse time periods; a reset circuit including normally open voltage biased to conduction means connected for activation by each voltage pulse developed and for the duration of each voltage pulse; with the reset circuit including a circuit path through first resistive means of said multivibrator circuit means, and connected between a voltage supply connection and the input to the DC operational amplifier; and wherein said voltage pulse developing circuit means includes a DC voltage threshold level activated circuit; and with the normally open voltage biased to conduction means of the reset circuit connected for actuation with voltage developed through said DC voltage threshold level activated circuit; wherein a voltage summing network is employed at the input to the DC operational amplifier with resistive means as part of said DC control voltage input means and resistive means as part of said reset circuit; wherein said reset circuit includes a diode; said DC voltage level threshold activated circuit includes a Zener diode; wherein the DC voltage threshold level activated circuit is included in the connection between the DC operational amplifier and the multivibrator circuit; said multivibrator circuit is a one-shot multivibrator circuit having a plurality of multielement electronic control devices with at least one of said electronic control devices normally biased to the conductive state having a first electrode connection to a voltage potential reference, through second resistance means, a second electrode electronic circuit connection to an electrode of another of the plurality of multielement electronic control devices, and a third electrode connection through said first resistive means to a voltage supply; wherein said reset circuit is connected to the said third electrode of a multielement electronic control device; and said first resistive means connecting said third electrode to a voltage supply is effectively part of the impedance of said reset circuit; and wherein said first resistive means is a first portion of a voltage divider circuit path through said one-shot multivibrator circuit connected between said voltage supply connection and said voltage potential reference; and with resistive path means connected through said electronic control device normally biased to the conductive state from said first resistive means in parallel with a second portion of said voltage divider circuit path through said one-shot multivibrator circuit.

2. The DC to AC converter circuit of claim 1, wherein said multivibrator circuit means, including RC component voltage pulse time controlling means, is connected to the output of said DC operational amplifier and subject to activation for repeated cycling operation each time the output of said DC operational amplifier exceeds a predetermined voltage level.

References Cited

UNITED STATES PATENTS

| | | | |
|---|---|---|---|
| 2,861,239 | 11/1958 | Gilbert | 307—318 X |
| 2,997,602 | 8/1961 | Eachus | 307—282 |
| 3,018,385 | 1/1962 | O'Berry | 307—254 |
| 3,129,326 | 4/1964 | Balaban | 307—229 |
| 3,188,455 | 6/1965 | Quick | 307—229 X |
| 3,278,737 | 10/1966 | Germain | 307—229 X |
| 3,422,372 | 1/1969 | Post et al. | 307—271 X |
| 2,748,272 | 5/1956 | Schrock | 328—127 X |
| 2,748,278 | 5/1956 | Smith | 250—36 |
| 3,138,767 | 6/1964 | Levin | 328—127 X |
| 3,349,251 | 10/1967 | Wilder | 307—235 |
| 3,435,257 | 3/1969 | Lawrie | 307—289 |

DONALD D. FORRER, Primary Examiner

R. C. WOODBRIDGE, Assistant Examiner

U.S. Cl. X.R.

307—229, 271; 328—185; 331—113